(12) United States Patent
Han et al.

(10) Patent No.: US 11,694,000 B2
(45) Date of Patent: Jul. 4, 2023

(54) SIMULATION METHOD AND SIMULATER FOR OPTICAL NETWORK-ON-CHIP SYSTEM

(71) Applicant: RESEARCH & BUSINESS FOUNDATION SUNGKYUNKWAN UNIVERSITY, Suwon-si (KR)

(72) Inventors: Tae Hee Han, Seoul (KR); Yong Wook Kim, Seoul (KR); Jeong Beom Hong, Suwon-si (KR); Min Su Kim, Incheon (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 387 days.

(21) Appl. No.: 17/134,584

(22) Filed: Dec. 28, 2020

(65) Prior Publication Data
US 2021/0224438 A1    Jul. 22, 2021

(30) Foreign Application Priority Data
Jan. 20, 2020    (KR) .......................... 10-2020-0007628

(51) Int. Cl.
*G06F 30/20*    (2020.01)
(52) U.S. Cl.
CPC .................... *G06F 30/20* (2020.01)
(58) Field of Classification Search
CPC ...................................................... G06F 30/20
See application file for complete search history.

(56) References Cited

U.S. PATENT DOCUMENTS

2008/0013882 A1*    1/2008    Chang .................. G02B 6/2861
385/15

OTHER PUBLICATIONS

Lee JH, Yoo JC, Han TH. System-level design framework for insertion-loss-minimized optical network-on-chip router architectures. Journal of Lightwave Technology. Jul. 14, 2014;32(18):3161-74. (Year: 2014).*
Duong LH, Nikdast M, Le Beux S, Xu J, Wu X, Wang Z, Yang P. A case study of signal-to-noise ratio in ring-based optical networks-on-chip. IEEE Design & Test. Jul. 8, 2014;31(5):55-65. (Year: 2014).*
Wu R, Chen CH, Fedeli JM, Fournier M, Beausoleil RG, Cheng KT. Compact modeling and system implications of microring modulators in nanophotonic interconnects. In2015 ACM/IEEE International Workshop on System Level Interconnect Prediction (SLIP) Jun. 6, 2015 (pp. 1-6). IEEE. (Year: 2015).*
Kim, Min Su et al., "Transient response modeling of Microring Resonator for design and verification on Optical Network-on-Chip", The Institute of Electronics and Information Engineers, Jun. 2018, (pp. 207-210).
Kim, Min Su., "Microring Resonator Modeling for Design and Verification of Optical On-chip Interconnect", Sungkyunkwan University, Oct. 2018 (pp. 1-67).

(Continued)

*Primary Examiner* — Chuen-Meei Gan
(74) *Attorney, Agent, or Firm* — NSIP Law

(57) ABSTRACT

A simulation method and simulator for a system including a plurality of microring resonators, where the simulation method includes converting the plurality of microring resonators into an equivalent model, generating a virtual system including the equivalent model, inputting an input signal to the virtual system, and outputting an output signal from the virtual system.

16 Claims, 15 Drawing Sheets

(56) References Cited

OTHER PUBLICATIONS

Kim, Min Su et al., "System-Level Signal Analysis Methodology for Optical Network-on-Chip Using Linear Model-Based Characterization", *IEEE Transactions on Computer-Aided Design of Integrated Circuits and Systems*, vol. 39, Issue 10, Aug. 2020 (pp. 1-11).
Korean Office Action dated Nov. 2, 2020 in counterpart Korean Patent Application No. 10-2020-0007628 (4 pages in Korean).

\* cited by examiner

FIG. 13

| Case | Model | Time stamp (fs) | Accuracy (%) (MD) | Accuracy (%) (FIN) | Runtime (s) |
|---|---|---|---|---|---|
| AMS_1fs | AMS | 1 | 100.00 | 100.00 | 3137.42 |
| AMS_10fs | AMS | 10 | 100.00 | 99.55 | 325.86 |
| AMS_100fs | AMS | 100 | 99.88 | 97.95 | 33.62 |
| CMOP | CMOP | – | 99.63 | 98.43 | 0.67 |

MD : modulator output signal
FIN : final signal on destination node

SIMULATION METHOD AND SIMULATER FOR OPTICAL NETWORK-ON-CHIP SYSTEM

CROSS-REFERENCE TO RELATED APPLICATION

This application is based on and claims priority under 35 U.S.C. 119 to Korean Patent Application No. 10-2020-0007628, filed on Jan. 20, 2020, the contents of which are all hereby incorporated by reference herein in their entirety.

BACKGROUND OF THE INVENTION

Field of the Invention

The present disclosure relates to a simulation method and a simulator for an optical network-on-chip system.

Description of the Related Art

Network-on-chip (NoC) has been developed to expand the performance of the system on chip. That is, the network-on-chip is an on-chip communication structure.

As the paradigm shifts from a processing-oriented computing system to a data-oriented computing system in recent years, there is a need to overcome physical limitations such as EMI, heat generation, and latency of the existing electric devices. Since a conventional network-on-chip uses a metal wiring network based on an electrical interconnection, there are physical limitations in terms of bandwidth, power consumption, and latency due to the metal wiring.

Recently, a silicon photonics-based optical NoC has been developed to solve the disadvantages of the conventional network-on-chip.

However, the simulation method for design and verification of a conventional optical network-on-chip system may be divided into a finite-difference time-domain (FDTD) method and a verilog-AMS-based method that introduces a complex optical signal model. However, the conventional simulation methods have a problem that the simulation takes several hours or tens of days or more because each physical property of an optical network-on-chip is calculated by a complex formula.

In addition, the simulation for design and verification of the conventional optical network-on-chip system included a variation of a signal-to-noise ratio (SNR) value due to a phase effect, and thus had a problem in that it was difficult to extract an accurate SNR.

SUMMARY OF THE INVENTION

The present disclosure aims to provide a faster simulation method and a faster simulator through a modeling method using linearity of an optical network-on-chip.

In addition, the present disclosure aims to provide a simulation method and a simulator capable of measuring an accurate SNR in consideration of a phase effect of an optical network-on-chip system.

In addition, the present disclosure aims to reduce the overall design time of an optical network through a linear modeling method, and to provide a simulation method and a simulator for power optimization of an optical signal.

Technical problems to be achieved by the present disclosure are not limited to the aforementioned technical problems, and other technical problems not described above may be evidently understood by those of ordinary skill in the art to which the present disclosure belongs from the following description.

In order to solve the above-described problem, the present disclosure, in a simulation method for a system including a plurality of microring resonators, may include, the plurality of microring resonators include a microring resonator (MR) modulator and an MR switch, in order to synchronize a first period, which is a calculation period of the MR modulator, with a second period, which is a calculation period of the MR switch, interpolating the first period based on the following equation:

$$\begin{cases} y_{on \to off}(t) = y_{off} + (y_{on} - y_{off}) \cdot (r_{off} \cdot \beta_{off})^{\frac{t}{\tau c_{md}}} \\ y_{off \to on}(t) = y_{on} + (y_{off} - y_{on}) \cdot (r_{on} \cdot \beta_{on})^{\frac{t}{\tau c_{md}}} \end{cases}$$

where the $\tau c_{md}$ is the first period before the interpolating, the $r_{on}$ is a self-coupling ratio value of an optical coupler included in the microring resonator in an ON state, the $\beta_{on}$ is a transfer coefficient of a phase shifter included in the microring resonator in the ON state; generating an equivalent model corresponding to the plurality of microring resonators based on parameters for the plurality of microring resonators; generating a virtual system including the equivalent model; inputting an input signal to the virtual system; and outputting an output signal from the virtual system.

In addition, the input signal may pass through the MR switch from the MR modulator and may be output as the output signal.

In addition, the MR switch may include a drop terminal and a through terminal, and a period of a signal transmitted to the drop terminal and a period of a signal transmitted to the through terminal may be the same.

In addition, each of the plurality of microring resonators may further include a waveguide.

In this case, the parameters may include a self-coupling ratio of the optical coupler, a cross-coupling ratio of the optical coupler, a transfer coefficient of the phase shifter, and a round-trip time of the phase shifter.

In addition, the parameters may include parameters for attenuation, phase shift, and time delay.

In addition, the system may be a linear time invariant (LTI) system.

In addition, the equivalent model may be one equivalent model corresponding to all of the plurality of microring resonators.

In addition, in order to solve the above-described problem, in a simulator for a system including a plurality of microring resonators, the present disclosure may include a memory, and a processor configured to control the memory, wherein the processor may be configured to, the plurality of microring resonators include a microring resonator (MR) modulator and an MR switch, in order to synchronize a first period, which is a calculation period of the MR modulator, with a second period, which is a calculation period of the MR switch, interpolate the first period based on the following equation:

$$\begin{cases} y_{on \to off}(t) = y_{off} + (y_{on} - y_{off}) \cdot (r_{off} \cdot \beta_{off})^{\frac{t}{\tau c_{md}}} \\ y_{off \to on}(t) = y_{on} + (y_{off} - y_{on}) \cdot (r_{on} \cdot \beta_{on})^{\frac{t}{\tau c_{md}}} \end{cases}$$

where $\tau c_{md}$ the is the first period before the interpolating, the $r_{on}$ is a self-coupling ratio value of an optical coupler included in the microring resonator in an ON state, the $\beta_{on}$ is a transfer coefficient of a phase shifter included in the microring resonator in the ON state, generate an equivalent model corresponding to the plurality of microring resonators based on parameters for the plurality of microring resonators, generate a virtual system including the equivalent model, input an input signal to the virtual system, and output an output signal from the virtual system.

In addition, the input signal may pass through the MR switch from the MR modulator and may be output as the output signal.

In addition, the MR switch may include a drop terminal and a through terminal, and a period when a signal is transmitted to the drop terminal and a period when a signal is transmitted to the through terminal may be the same.

In addition, each of the plurality of microring resonators may further include a waveguide.

In this case, the parameters may include a self-coupling ratio of the optical coupler, a cross-coupling ratio of the optical coupler, a transfer coefficient of the phase shifter, and a round-trip time of the phase shifter.

In addition, the parameters may include parameters for attenuation, phase shift, and time delay.

In addition, the system may be a linear time invariant (LTI) system.

In addition, the equivalent model may be one equivalent model corresponding to all of the plurality of microring resonators.

The present disclosure has an effect of providing a faster simulation method and a faster simulator through a linear modeling method using linearity of an optical network-on-chip.

In addition, the present disclosure has an effect of providing a simulation method and a simulator capable of measuring an accurate SNR in consideration of a phase effect of an optical network-on-chip system.

In addition, the present disclosure has an effect of reducing the overall design time of an optical network through a linear modeling method, and providing a simulation method and a simulator for power optimization of an optical signal.

The effects obtained in the present disclosure are not limited to the above-mentioned effects, and other effects not mentioned will be clearly understood by those of ordinary skill in the art to which the present disclosure belongs from the following description.

BRIEF DESCRIPTION OF THE DRAWINGS

The accompanying drawings, which are included as a part of the description to help understanding the present disclosure, provide embodiments of the present disclosure and describe the technical features of the present disclosure with the description.

FIG. 13 is a table comparing accuracy of a simulation method and an AMS method according to a first embodiment of the present disclosure.

DETAILED DESCRIPTION OF THE EMBODIMENTS

Figure 1A:
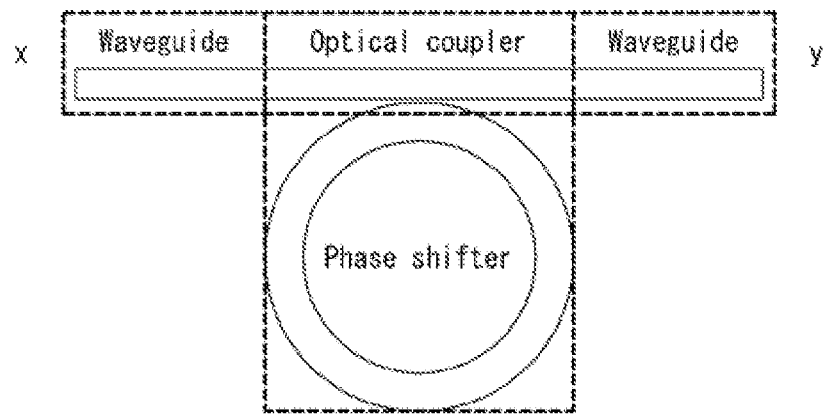
FIGS. 1A and 1B are diagrams illustrating a microring resonator according to the present disclosure.

Hereinafter, embodiments disclosed in the present disclosure will be described in detail with reference to the accompanying drawings, but the same or similar elements are denoted by the same reference numerals regardless of the reference numerals, and redundant descriptions thereof will be omitted. The suffixes "module" and "unit" of elements used in the following description are given or used interchangeably in consideration of only the ease of writing the specification, and do not themselves have a distinct meanings or roles. In addition, in describing the embodiments disclosed in the present disclosure, when it is determined that a detailed description of related known technologies may obscure the subject matter of the embodiments disclosed in the present disclosure, the detailed description thereof will be omitted. In addition, the accompanying drawings are for easy understanding of the embodiments disclosed in the present disclosure, the technical spirit disclosed in the present disclosure is not limited by the accompanying drawings, and are to be understood as including all modifications, equivalents, and alternatives included in the spirit and scope of the present disclosure.

While terms, such as "first", "second", etc., may be used to describe various elements, the elements are not limited by the above terms. The above terms are used only for the purpose of distinguishing one element from another element.

When an element is referred to as being "coupled" or "connected" to another element, it should be understood that other element may exist in the middle although the element may be directly coupled or connected to the other element. On the other hand, when an element is referred to as being "directly coupled" or "directly connected" to another element, it should be understood that there is no other element in the middle.

Expressions in the singular include plural expressions unless the context clearly indicates otherwise.

In the present disclosure, it should be understood that terms such as "comprises" or "have" are intended to designate the presence of features, numbers, steps, operations, elements, parts, or combinations thereof described in the specification, but do not preclude the possibility of the presence or addition of one or more other features, numbers, steps, operations, elements, parts, or combinations thereof.

Hereinafter, a detailed description of a simulation method for an optical network-on-chip system according to a first preferred embodiment of the present disclosure is as follows.

Figure 1B:
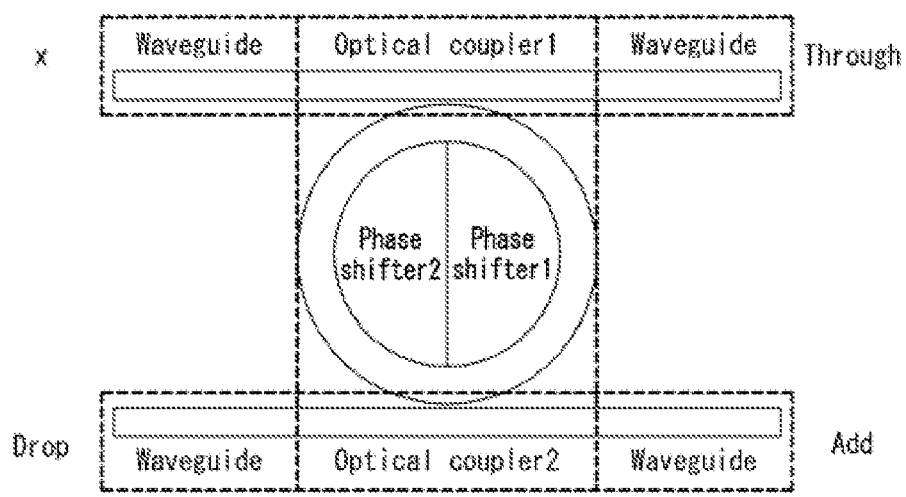

FIGS. 1A and 1B are diagrams illustrating a microring resonator according to the present disclosure.

The microring resonator (MR) may include a resonance structure. The microring resonator may refer to an optical device capable of controlling a signal path and a communication path. The microring resonator may include an MR modulator and an MR switch. The microring resonator may include a waveguide, an optical coupler, and a phase shifter.

According to FIG. 1A, the MR modulator according to the present disclosure may include a waveguide, an optical coupler, and a phase shifter. The MR modulator may control an output signal according to a bias condition of the phase shifter.

When an input signal x(t) is input to the MR modulator, an output signal y(t) is output, and the relationship between the two signals may be determined by the following linear equation. In this case, t may mean time in a second (s) unit, and x(t) and y(t) may be watt (W) units as signal intensity.

$$\begin{cases} y(t) = r \cdot x(t) - j \cdot k \cdot C_{out}(t) \\ C_{in}(t) = -j \cdot k \cdot x(t) + r \cdot C_{out}(t) \\ C_{out}(t) = \alpha \cdot C_{in}(t - \tau) \end{cases} \quad \text{[Equation 1.1]}$$

In this case, $c_{in}(t)$ and $c_{out}(t)$ may represent input/output signals of the phase shifter, respectively, and may mean α complex coefficient representing insertion loss and phase delay as a transmission rate. The optical coupler is a device that exchanges signals between two waveguides, and its pass ratio is r and its coupling ratio is k, and it may follow the relationship of $|r|^2+|k|^2=1$ according to energy conservation (however, $j=\sqrt{-1}$).

According to FIG. 1B, the MR switch according to the present disclosure may transmit the input signal to a drop terminal and a through terminal under control of the phase shifter in a form in which an additional waveguide is disposed in the modulator.

The MR switch may include the drop terminal and the through terminal, and in this case, a period of a signal transmitted to the drop terminal and a period of a signal transmitted to the through terminal may be the same.

In addition, the input signal may pass through the MR switch from the MR modulator and may be output as the output signal. That is, it may pass in the order of the MR modulator and the MR switch.

However, the characteristics of the output signal may vary according to a bias applied to the phase shifter.

The MR switch may also be expressed in a linear expression. When the input signal x(t) and an addition terminal signal A(t) are input to the MR switch, a drop terminal signal D(t) and a through terminal signal T(t) may be determined by the following linear equation. In this case, t may mean time in a second (s) unit, and x(t), A(t), D(t) and T(t) may be watt (W) units as signal intensity.

$$\begin{cases} T(t) = r_1 \cdot x(t) - j \cdot k_1 \cdot C_{out2}(t) \\ D(t) = r_2 \cdot A(t) - j \cdot k_2 \cdot C_{out1}(t) \\ C_{in1}(t) = -j \cdot k_1 \cdot x(t) + r_1 \cdot C_{out2}(t) \\ C_{in2}(t) = -j \cdot k_2 \cdot A(t) + r_2 \cdot C_{out1}(t) \\ C_{out1}(t) = \beta_1 \cdot C_{in1}(t - \tau_1) \\ C_{out2}(t) = \beta_2 \cdot C_{in2}(t - \tau_2) \end{cases} \quad \text{[Equation 1.2]}$$

In this case, $c_{in1}(t)$, $c_{out1}(t)$, and $\beta_1$ may represent an input signal, an output signal, and a transfer coefficient of a right phase shifter, respectively, and $c_{in2}(t)$, $c_{out}(t)$, and $\beta_2$ may represent an input signal, an output signal, and a transmission rate of a left phase shifter. $r_1$, $k_1$ may mean a coupling ratio of an upper coupler, and $r_2$, $k_2$ may mean a coupling ratio of a lower coupler.

In addition, an optical network-on-chip according to the present disclosure may mean a photonics device. The optical network-on-chip may include linearity, and dramatically increase bandwidth by combining wavelength division multiplexing (WDM). The microring resonator is a representative photonics device.

Values representing characteristics of the photonics device may include insertion loss, cross-talk noise, extinction ratio, etc.

The insertion loss may mean a ratio of the intensity attenuated as the optical signal passes through a silicon photonics device. All optical devices may be transmitted with a signal attenuated inevitably due to their physical properties, and energy efficiency of the optical communication system may vary depending on the insertion loss. The intensity of the optical signal may be expressed as dBm, and the insertion loss may be used in dB unit for convenience of calculation.

The cross-talk noise may mean noise caused by a phenomenon in which a leakage signal enters another signal path and is coupled. The leakage signal may mean a signal propagating in a direction different from the intention, such as reflected off the device and bounced off, or partially leaks when the optical signal is applied to the optical device.

The extinction ratio may mean an on-off intensity ratio of an optical modulator. In general, it is known that a signal can be discriminated at a receiver when using a modulator with an extinction ratio of 7-10 dB or more.

That is, a simulation method according to a first embodiment of the present disclosure may have one purpose of calculating insertion loss, cross-talk noise, extinction ratio, SNR, and the like by simulating the input and output signals.

In this case, the method of calculating the SNR is as follows.

$$SNR = \frac{A^2}{A^2 + N^2} \quad \text{[Equation 1.3]}$$

(However, A is an amplitude of an optical signal, N is an amplitude of a cross-talk noise)

However, in this case, since the phase effect cannot be considered, the phase value may be reflected in the above equation as follows.

$$SNR = \frac{(A\cos\theta_1)^2}{(A\cos\theta_1)^2 + (N\cos\theta_2)^2} \quad \text{[Equation 1.4]}$$

(However, A is an amplitude of a optical signal, N is an amplitude of a cross-talk noise, $\theta_1$ is a phase of a optical signal, $\theta_2$ is a phase of a cross-talk noise)

Thus, a simulation method for calculating the SNR considering the phase will be described later.

Figure 2:
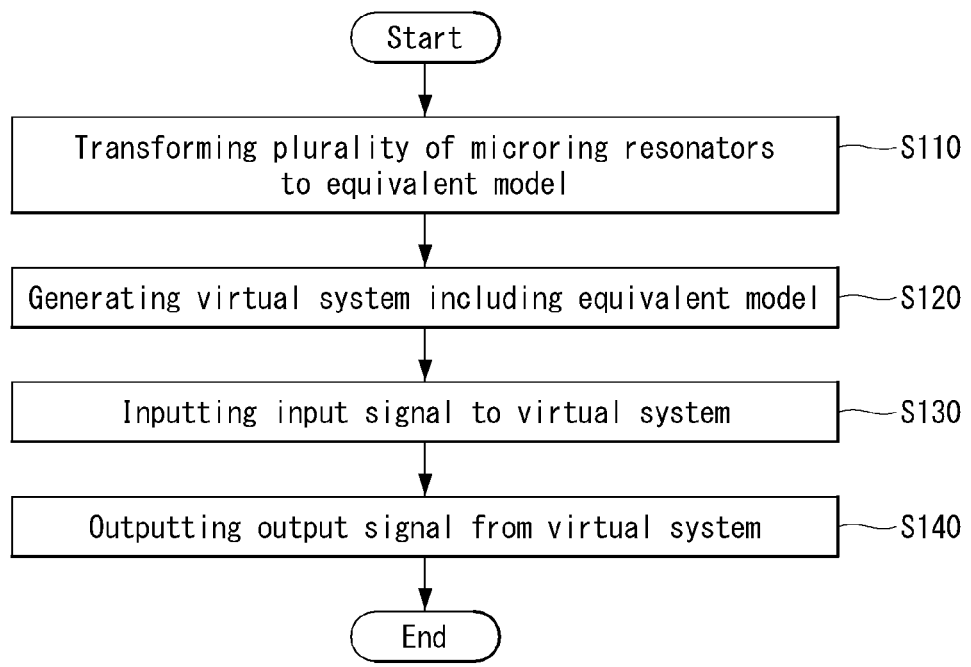
FIG. 2 is a diagram illustrating a simulation method according to a first embodiment of the present disclosure.
Figure 3:
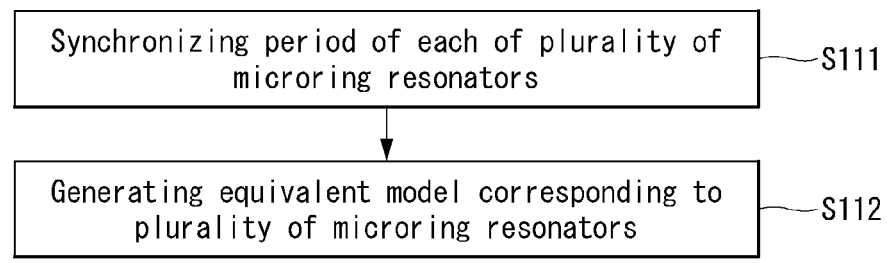
FIG. 3 is a diagram illustrating an equivalent model transformation step according to a first embodiment of the present disclosure.

FIG. 2 is a diagram illustrating a simulation method according to a first embodiment of the present disclosure, and FIG. 3 is a diagram illustrating an equivalent model transformation step according to a first embodiment of the present disclosure.

The simulation method according to the first embodiment of the present disclosure may be a simulation method for a system including a plurality of microring resonators (i.e. an optical network-on-chip system).

The system including the plurality of microring resonators (i.e. the optical network-on-chip system) may be a linear time invariant (LTI) system. That is, even if the order of each of the plurality of microring resonators is changed, the same output signal may be output.

According to FIG. 2, the simulation method according to the first embodiment of the present disclosure may include transforming to an equivalent model (S110), generating a virtual system including the transformed equivalent model (S120), inputting an input signal to the generated virtual system (S130) and outputting an output signal from the generated virtual system (S140).

According to FIG. 3, the transforming to an equivalent model (S110) according to the first embodiment of the present disclosure may include synchronizing a period of each of the plurality of microring resonators (S111) and generating an equivalent model corresponding to the plurality of microring resonators based on parameters for the plurality of microring resonators (S112).

In this case, the parameters may include a self-coupling ratio of the optical coupler, a cross-coupling ratio of the optical coupler, a transfer coefficient of the phase shifter, and a round-trip time of the phase shifter.

In addition, the parameters may include parameters for attenuation, phase shift, and time delay. The attenuation may mean a degree to which power is attenuated as a signal passes through the waveguide. The phase shift may mean a degree to which phase is changed as a signal passes through the phase shifter. The time delay may mean a delayed time as a signal passes through an optical element. In this case, the optical element may be a concept including the waveguide, the microring resonator, and the like mainly used in an optical network.

Figure 4:
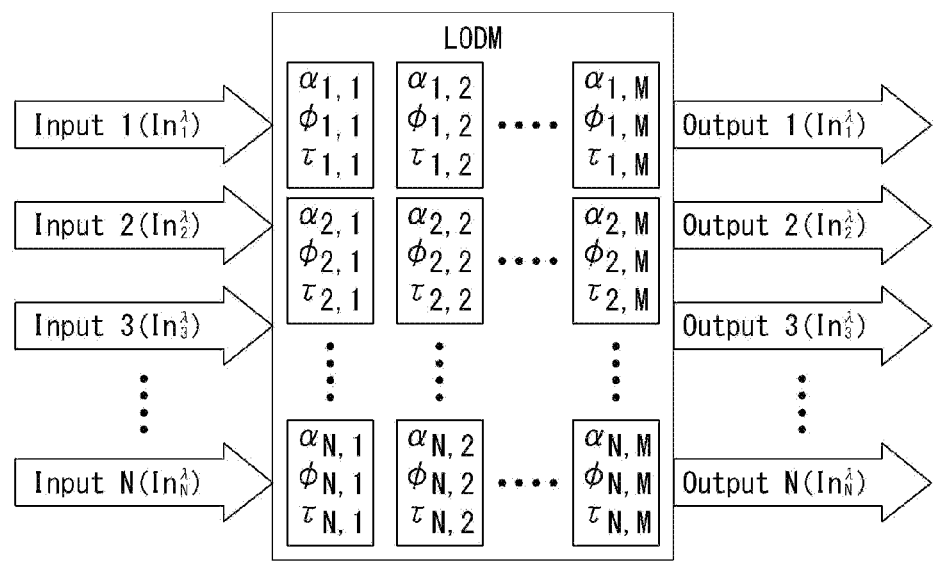
FIG. 4 is a diagram illustrating a linear equivalent model according to a first embodiment of the present disclosure.

FIG. 4 is a diagram illustrating a linear equivalent model according to a first embodiment of the present disclosure.

The optical network-on-chip system according to the present disclosure may have a linear time invariant (LTI) property.

According to FIG. 4, the linear equivalent model according to the first embodiment of the present disclosure may be illustrated as a linear optical device model (LODM). When N inputs are entered into the LODM, M outputs corresponding thereto may be output. That is, optical signals having different wavelengths may be propagated independently each other due to insufficient interference and influence, and the linear equivalent model may be linearly proportional to the number of used wavelengths $\lambda$, thereby enabling parallel simulation.

According to FIG. 4, the LODM according to the first embodiment of the present disclosure may be displayed using parameters for attenuation a, phase shift $\phi$, and time delay $\tau$.

According to FIG. 4, the LODM according to the first embodiment of the present disclosure may include N-input ports and M-output ports. In this case, the relationship between the N inputs $In_1^\lambda$ and M outputs $Out_0^\lambda$ may follow the following equation.

$$T_{i,o}^\lambda = a_{i,o}^\lambda \cdot e^{k\cdot\phi^\lambda} \cdot In_{i,o}^\lambda(t-\tau_{i,o}^\lambda) \quad \text{[Equation 2.1]}$$

for $\forall^i \in (1, 2, 3, \ldots, N), \forall_o \in (1, 2, 3, \ldots, M)$ $$Out_o^\lambda = \sum_{\forall i} T_{i,o}^\lambda(t) \quad \text{[Equation 2.2]}$$

In this case, $a_{i,o}^\lambda$, $\phi_{i,o}^\lambda$, and $r_{i,o}^\lambda$ may represent attenuation a, phase shift $\phi$, and time delay $\tau$, respectively, and may mean parameters when a signal is transmitted from port i to port o. In addition, $T_{i,o}^\lambda$ may mean a signal transmitted to an output terminal. In addition, t may mean time in a second (s) unit, and $\lambda$ may mean a wavelength in a nanometer (nm) unit.

Figure 5A:
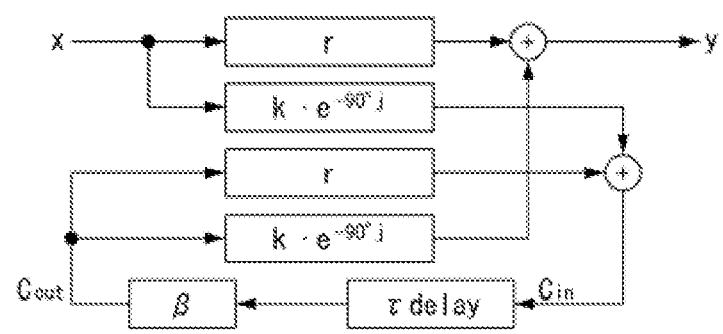
FIGS. 5A and 5B are diagrams illustrating an equivalent model according to a first embodiment of the present disclosure.
Figure 5B:
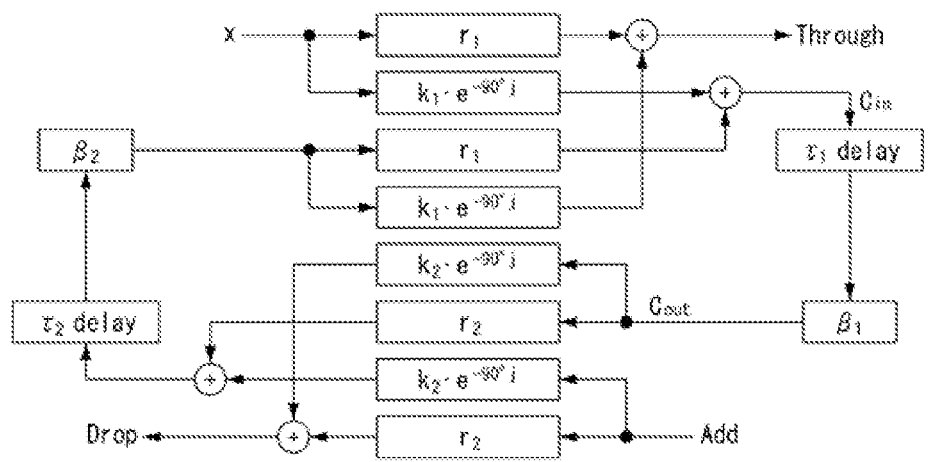
Figure 6A:
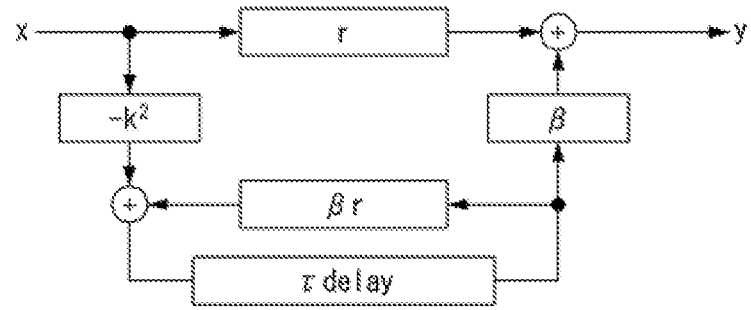
FIGS. 6A to 6C are diagrams illustrating another equivalent model according to a first embodiment of the present disclosure.
Figure 6B:
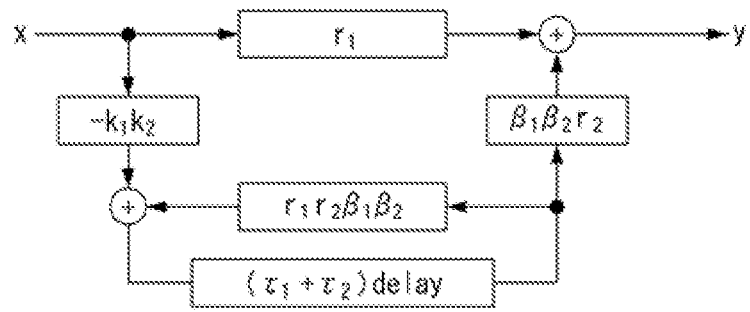
Figure 6C:
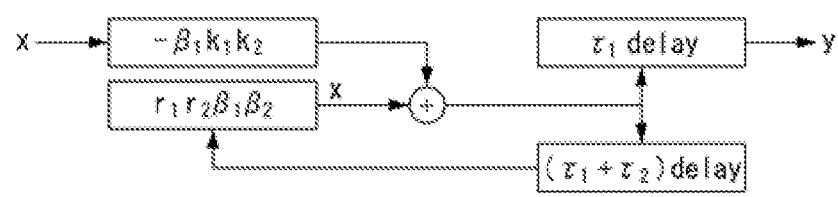

FIGS. 5A and 5B are diagrams illustrating an equivalent model of a microring resonator according to a first embodiment of the present disclosure, and FIGS. 6A to 6C are diagrams illustrating another equivalent model according to a first embodiment of the present disclosure.

FIG. 5A may be a diagram illustrating an equivalent model of an MR modulator, and FIG. 5B may be a diagram illustrating an equivalent model of an MR switch.

FIGS. 6A to 6C may be diagrams illustrating an equivalent circuit differently expressed in an equivalent circuit according to FIGS. 5A and 5B. The equivalent circuit of FIGS. 6A to 6C is shown more briefly than the equivalent circuit according to FIGS. 5A and 5B.

FIG. 6A may be a diagram illustrating another equivalent model of the MR modulator, FIG. 6B may be a diagram illustrating an equivalent model of a through port of the MR switch, and FIG. 6C may be a diagram illustrating an equivalent model of a drop port of the MR switch.

In this case, the illustrated parameters may include a self-coupling ratio $r_1$, $r_2$ of the optical coupler, a cross-coupling ratio $k_1$, $k_2$ of the optical coupler, a transfer coefficient $\beta_1$, $\beta_2$ of the phase shifter, and a round-trip time $\tau_1$, $\tau_2$ of the phase shifter. The parameters may be input values required to input the equivalent model.

The transfer coefficient $\beta$ of the phase shifter may be defined as follows.

$$\beta = a\cdot e^{j\cdot\phi} \quad \text{[Equation 3.1]}$$

(However, a is a power attenuation of a waveguide, $\phi$ s a phase difference of a signal)

Figure 7:
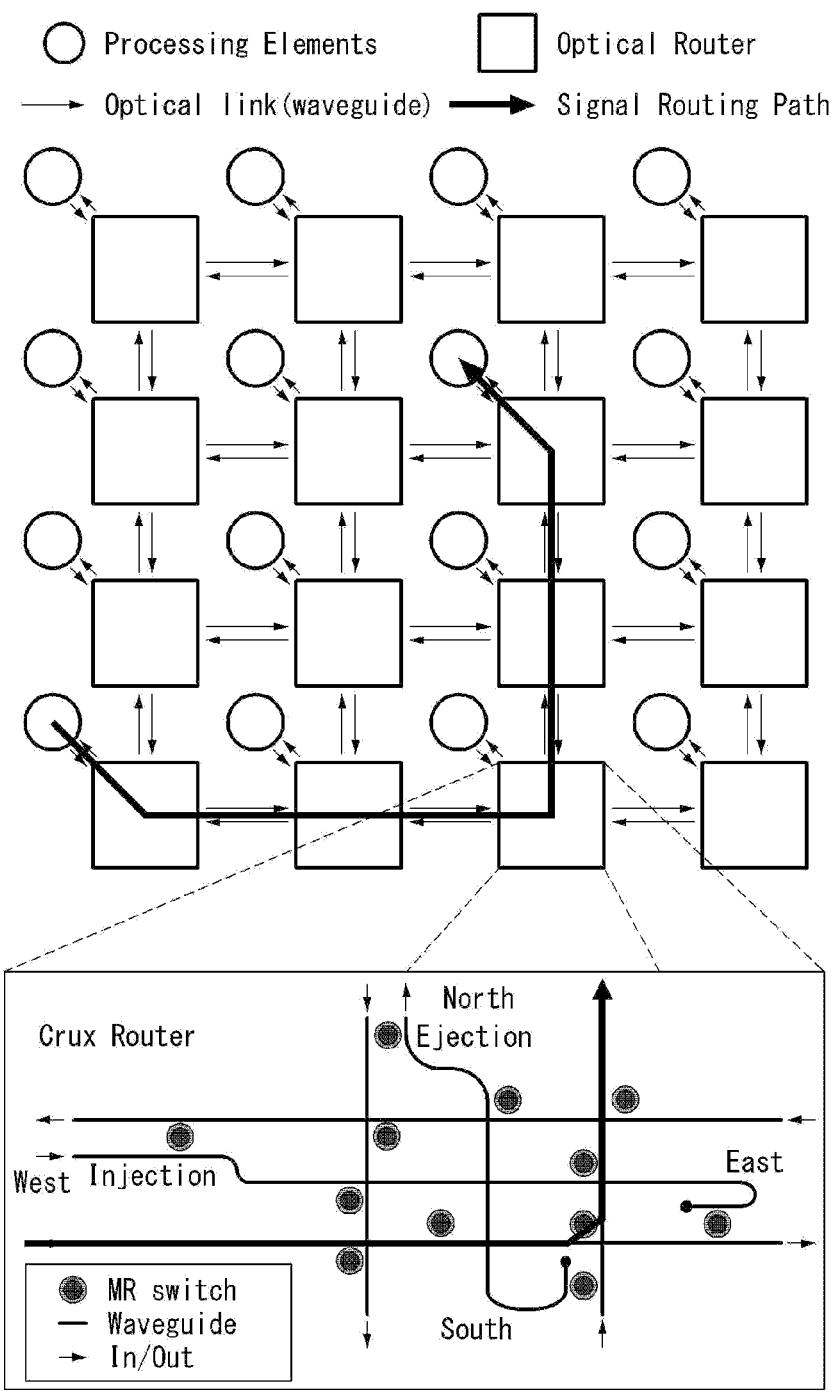
FIG. 7 is a diagram illustrating an example of propagating a signal according to a first embodiment of the present disclosure.

FIG. 7 is a diagram illustrating an example of propagating a signal according to a first embodiment of the present disclosure, and FIGS. 8A to 8D are diagrams illustrating a virtual system according to a first embodiment of the present disclosure.

According to FIG. 7, a routing path may be set from a source where an optical signal starts to a desired node. When the routing path is set, the direction of the optical signal may be determined according to the MR switch.

According to FIG. 7, there may be no branches or loops in a path through which an optical signal of an optical network-on-chip system is propagated. In addition, an optical router included in the optical network-on-chip system may be a crux router. The router may include a plurality of MR switches, and the direction of the optical signal may be determined according to the operation of the MR switch.

According to FIGS. 8A to 8D, since the optical network-on-chip system has a linear time invariant property, an output signal according to the same input signal may not change even if interconnected optical elements are rearranged.

FIGS. 8A to 8D illustrate a process of rearranging optical elements to configure an equivalent circuit.

According to FIGS. 8A to 8D, a process of configuring the equivalent circuit may list configurations of a system including a plurality of microring resonators, rearrange the listed configurations, and configure the equivalent circuit by grouping the same configurations among the rearranged configurations. That is, the microring resonator may be subdivided into configurations such as an MR modulator, an MR switch including a through port and a drop port, a waveguide, and the like, and rearrange the subdivided configurations to group the same configurations.

Figure 8A:
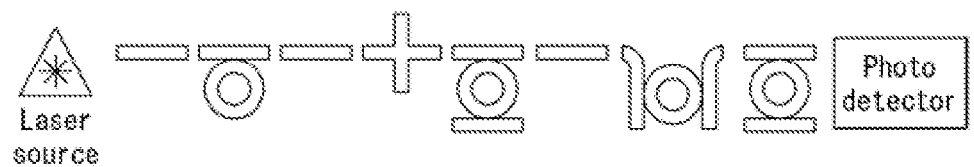
FIGS. 8A to 8D are diagrams illustrating a virtual system according to a first embodiment of the present disclosure.
Figure 8B:
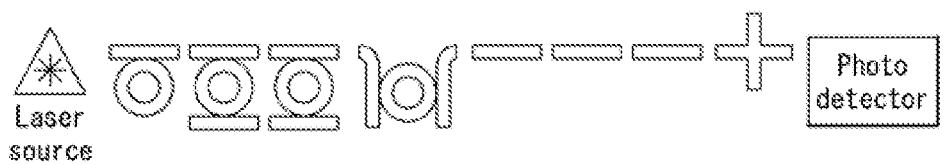
Figure 8C:
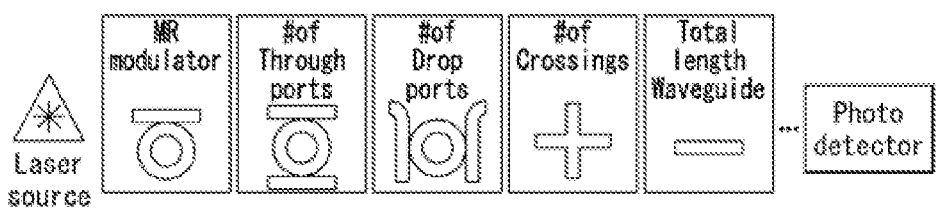
Figure 8D:
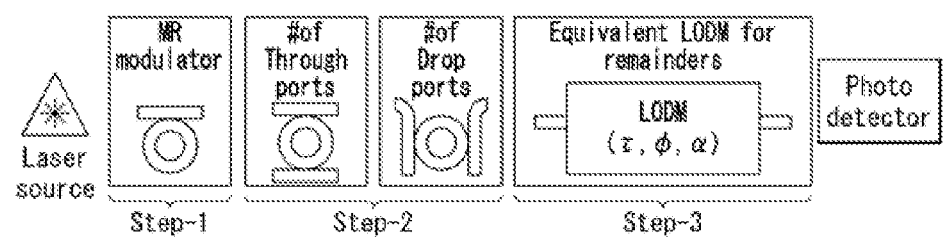

As an example, since a plurality of waveguides are arranged in FIGS. 8A and 8B, the output signal does not change due to the linearity of the system even if the plurality of waveguides are rearranged to be grouped. Accordingly, the plurality of waveguides may be grouped into one waveguide, and the grouping process may be applied to other subdivided configurations.

Figure 9:
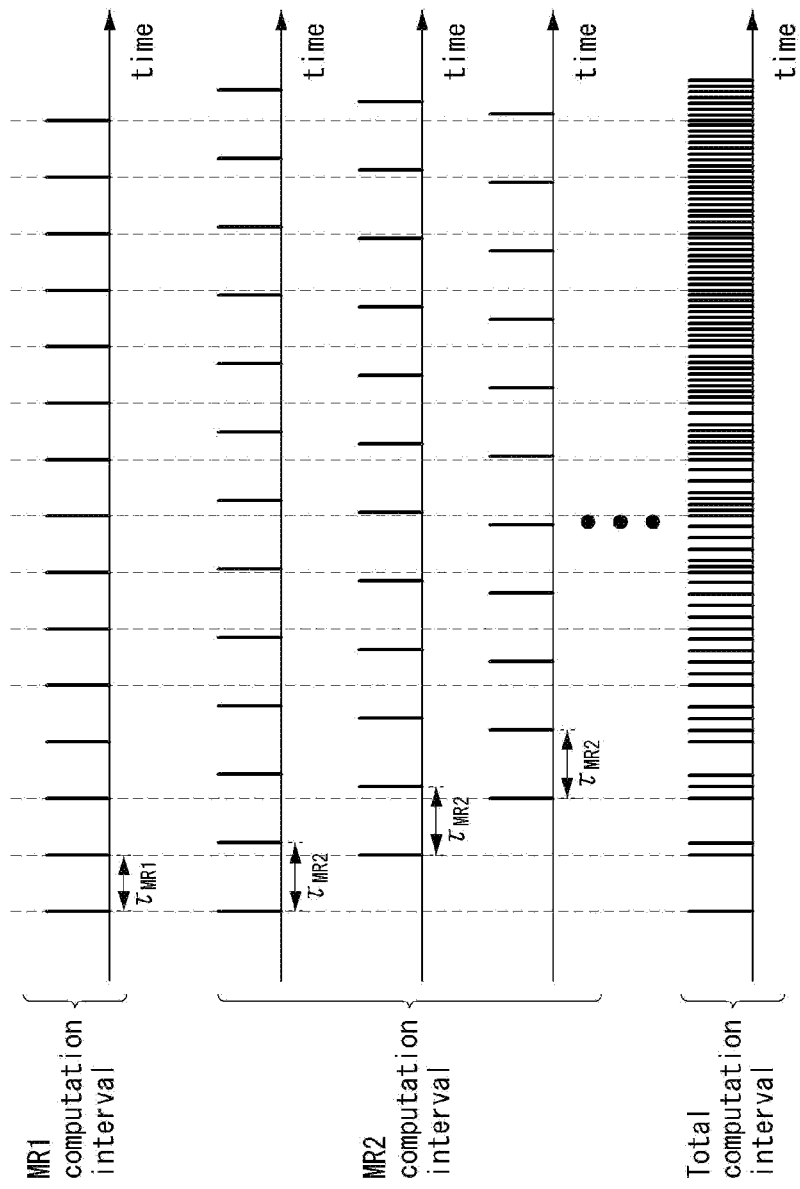
FIG. 9 is a diagram illustrating a synchronization step according to a first embodiment of the present disclosure.
Figure 10A:
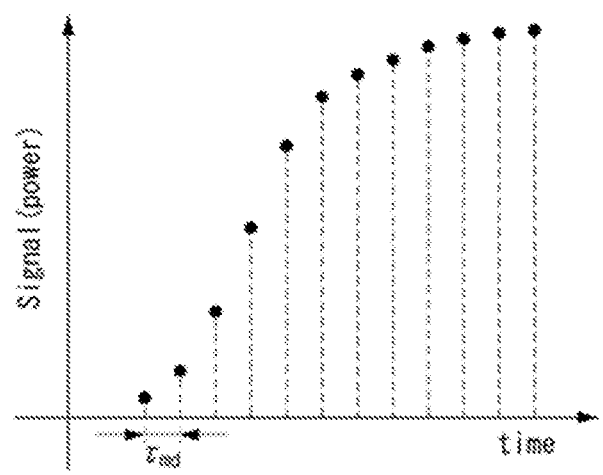
FIGS. 10A and 10B are diagrams illustrating matching periods through signal interpolation according to a first embodiment of the present disclosure.
Figure 10B:
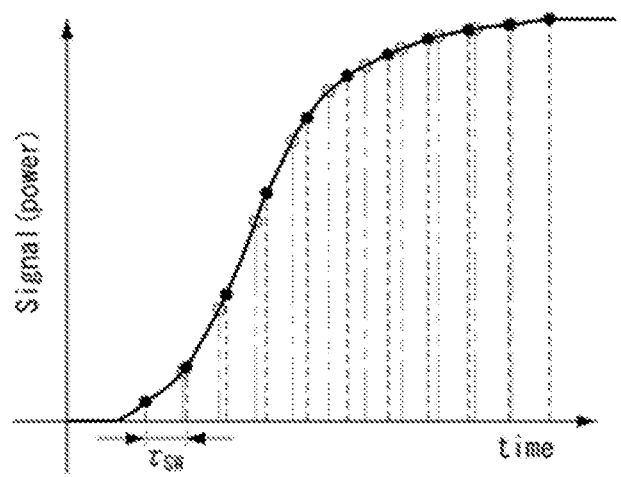

FIG. 9 is a diagram illustrating a synchronization step according to a first embodiment of the present disclosure, and FIGS. 10A and 10B are diagrams illustrating matching periods through signal interpolation according to a first embodiment of the present disclosure.

According to FIG. 9, since the microring resonator includes a resonance structure, calculation of a signal may be repeated. In particular, in order to calculate repetitive calculations of the resonance structure at the same time point, there is a need to match the calculation periods.

Assuming that the physical structure of the MR modulator and the MR switch are the same, a calculation period of each MR modulator may be constant as τc, and a calculation period of the MR switch may also be constant as (τc$_1$+τc$_2$). In addition, all optical signals may go through a process of starting from the MR modulator, passing through a plurality of MR switches, and arriving at a receiver.

That is, when an input signal is input to the microring resonator, the output signal output from the microring resonator may be periodically calculated for each round-trip time until convergence due to repetitive rotational motion of the signal within the resonant structure According to FIG. 9, a first resonator having a round-trip time of $\tau_{MP1}$ and a second resonator having a round-trip time of $\tau_{MR2}$ may exist. The first resonator may be positioned in front of the direction in which the optical signal passes, and the second resonator may be positioned behind the direction in which the optical signal passes.

When a signal is input to the first resonator, the signal output from the first resonator may be input to the second resonator. When a signal is input to the second resonator, the second resonator may periodically change the input signal due to an internal rotation operation. Thus, if the periods of each of the first and second resonators are not equal to each other or are not multiples, it may take more time and more calculations until the signal output from the first resonator is stabilized.

However, since the MR modulator and the MR switch have different structures and manufacturing processes, each period may be different. Therefore, the calculation period of the MR modulator and the calculation period of the MR switch may be matched. That is, through the step (S111) of synchronizing the periods of each of the plurality of microring resonators according to the first embodiment of the present disclosure, in order to make a first period of a signal of the MR modulator and a second period of a signal of the MR switch the same, the first period of the MR modulator may be interpolated.

That is, the plurality of microring resonators may include the MR modulator including the signal of the first period and the MR switch including the signal of the second period, and synchronizing the periods of each of the plurality of microring resonators (S111) may interpolate the first period of the signal of the MR modulator to be the same as the second period of the signal of the MR switch.

FIG. 10A may show a signal and a calculation period ($\tau c_{md}$) of the MR modulator before interpolation. Further, FIG. 10B may be a graph obtained by interpolating the calculation period ($\tau c_{md}$) of the MR modulator according to the calculation period ($\tau c_{sw}$) of the MR switch.

The method of interpolating the calculation period may be performed by the following equation.

$$\begin{cases} y_{on \to off}(t) = y_{off} + (y_{on} - y_{off}) \cdot (r_{off} \cdot \beta_{off})^{\frac{t}{\tau c_{md}}} \\ y_{off \to on}(t) = y_{on} + (y_{off} - y_{on}) \cdot (r_{on} \cdot \beta_{on})^{\frac{t}{\tau c_{md}}} \end{cases} \quad \text{[Equation 4.1]}$$

In this case, $y_{on}$ may be a steady state output value in an ON state. Also, $y_{off}$ may be a steady state output value in an OFF state. Further, $r_{on}$ and $\beta_{on}$ may be a self-coupling ratio of the optical coupler and a transfer coefficient of the phase shifter in the ON state. Further, $r_{off}$ and $\beta_{off}$ may be a self-coupling ratio of the optical coupler and a transfer coefficient of the phase shifter in the OFF state.

In this case, the following equation may be calculated using $$R_{off} = (r_{off} \cdot \beta_{off})^{\frac{\tau c_{on}}{\tau c_{md}}} \text{ and } R_{on} = (r_{on} \cdot \beta_{on})^{\frac{\tau c_{on}}{\tau c_{md}}}.$$

$$\begin{cases} y_{on \to off}(t) = y_{off} + (y_{on} - y_{off}) \cdot (R_{off})^{\frac{t}{\tau c_{sw}}} \\ y_{off \to on}(t) = y_{on} + (y_{off} - y_{on}) \cdot (R_{on})^{\frac{t}{\tau c_{sw}}} \end{cases} \quad \text{[Equation 4.2]}$$

However, when considering the ON and OFF states, parameters for the equivalent circuit may be changed due to a non-linear effect. Therefore, in order to avoid such a non-linear effect, a parameter according to one of the parameters according to the ON and OFF states may be determined and used. In this way, the non-linear effect may be avoided.

Figure 11:
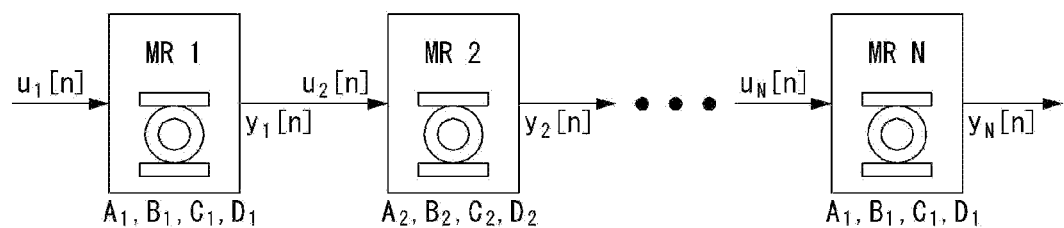
FIG. 11 is a diagram illustrating a state in which a plurality of microring resonators are connected side by side according to a first embodiment of the present disclosure.

FIG. 11 is a diagram illustrating a state in which a plurality of microring resonators are connected side by side according to a first embodiment of the present disclosure.

According to FIG. 11, when a plurality of microring resonators are connected side by side, input/output signals for the plurality of microring resonators may be expressed through the following equation.

$$\begin{cases} x_i(t+\tau) = A_i \cdot x_i(t) + B_i \cdot u_i(t) \\ y_i(t) = C_i \cdot x_i(t) + D_i \cdot u_i(t) \end{cases} \quad \text{[Equation 5.1]}$$

In this cases, $x_i$ may be a state signal, $y_i$ may be an output signal, and $n_i$ may be an input signal. $A_i$, $B_i$, $C_i$, and $D_i$ are coefficients and may be coefficients determined by the direction of the i-th MR switch port.

Figure 12A:
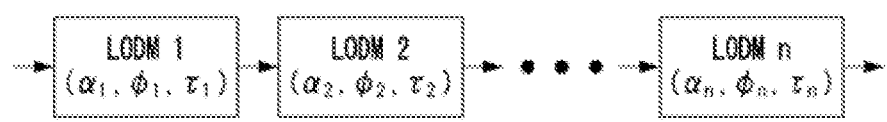
FIG. 12A is a diagram illustrating a state in which a plurality of equivalent models are connected side by side according to a first embodiment of the present disclosure.
Figure 12B:
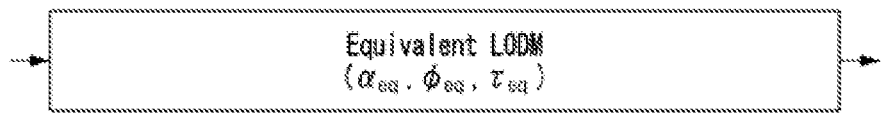
FIG. 12B is a diagram illustrating a plurality of equivalent models as one equivalent model according to a first embodiment of the present disclosure.

FIG. 12A is a diagram illustrating a state in which a plurality of equivalent models are connected side by side according to a first embodiment of the present disclosure, and FIG. 12B is a diagram illustrating a plurality of equivalent models as one equivalent model according to a first embodiment of the present disclosure.

According to FIG. 12B, the equivalent model according to the first embodiment of the present disclosure may be one equivalent model corresponding to all of the plurality of microring resonators.

In this case, one equivalent model may be expressed by using parameters of $a_{eq}$, $\phi_{eq}$, and $\tau c_{eq}$. The above parameters may be defined by the following equation.

$a_{eq} = \Pi a_i$ [Equation 6.1]

$\phi_{eq} = \Sigma \phi_i$ [Equation 6.2]

$\tau c_{eq} = \Sigma \tau c_i$ [Equation 6.3]

However, $a_i$, $\phi_i$, and $\tau c_i$ may be attenuation, phase difference, and calculation period of the i-th equivalent model, respectively.

Figure 14A:
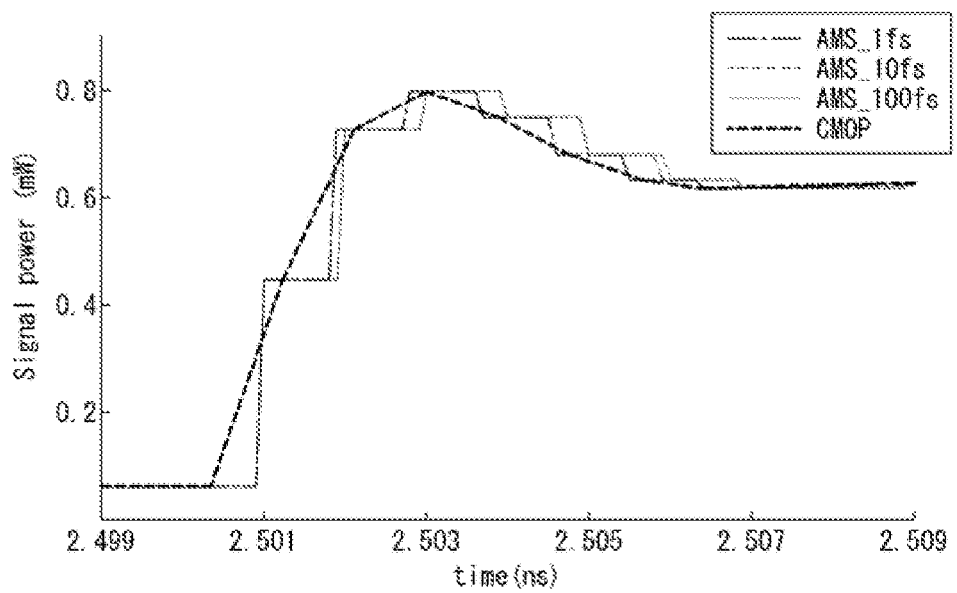
FIGS. 14A and 14B are graphs comparing accuracy of a simulation method and an AMS method according to a first embodiment of the present disclosure.
Figure 14B:
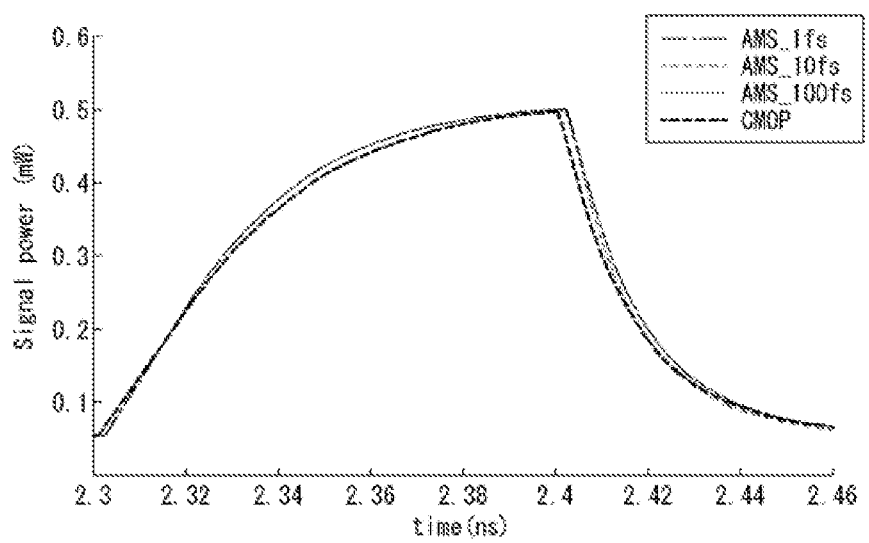

FIG. 13 is a table comparing accuracy of a simulation method and an AMS method according to a first embodiment of the present disclosure, and FIGS. 14A and 14B are graphs comparing accuracy of a simulation method and an AMS method according to a first embodiment of the present disclosure.

The simulation method according to the first embodiment of the present disclosure may be expressed as a computation method of optical signal propagation (CMOP).

According to FIGS. 13, 14A and 14B, the accuracy of a conventional AMS method according to several simulations with time stamp of 1, 10 and 100 fs is compared with that of the simulation method of the present disclosure (i.e. CMOP).

According to FIGS. 13, 14A and 14B, in the case of the MR modulator, the accuracy of the output signal in four cases decreases in the order of AMS 1 fs, AMS 10 fs, AMS 100 fs, and CMOP. However, in the four cases, the accuracy of the final received signal decreases in the order of AMS 1 fs, AMS 10 fs, CMOP, and AMS 100 fs. That is, the accuracy of CMOP may be lower than that of the AMS method. However, in the case of the final received signal, the CMOP may have better accuracy than the widest calculation interval of 100 fs in the AMS method. It can be seen that the simulation speed of CMOP is improved by 3 times, with an accuracy of 1.57% when compared to AMS simulation at time stamp of 1 fs.

Hereinafter, according to a second preferred embodiment of the present disclosure, a simulator for simulation of an optical network-on-chip system will be described in detail.

In addition, the simulator according to the second embodiment of the present disclosure may be a subject that performs the above-described simulation method according to the first embodiment of the present disclosure. Accordingly, the same or overlapping content as described above may be omitted.

Figure 15:
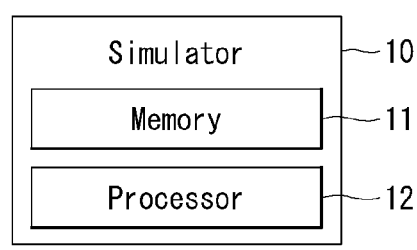
FIG. 15 is a diagram illustrating a simulator according to a second embodiment of the present disclosure.

FIG. 15 is a diagram illustrating a simulator according to a second embodiment of the present disclosure.

According to FIG. 15, a simulator 10 may be a simulator 10 for a system including a plurality of microring resonators, and include a memory 11 and a processor 12 for controlling the memory 11.

The processor 12 may transform a plurality of optical devices into an equivalent model, generate a virtual system including the transformed equivalent model, input an input signal to the generated virtual system, and output an output signal from the generated virtual system.

The memory 11 may store parameters for the plurality of microring resonators. In this case, the parameters may include a self-coupling ratio of the optical coupler, a cross-coupling ratio of the optical coupler, a transfer coefficient of the phase shifter, and a round-trip time of the phase shifter.

In addition, the parameters may include parameters for attenuation, phase shift, and time delay.

In addition, the processor 12 may synchronize periods of each of the plurality of microring resonators, and generate an equivalent model corresponding to the plurality of microring resonators based on the stored parameters.

The plurality of microring resonators may include an MR modulator including a signal of a first period and an MR switch including a signal of a second period, and the input signal may pass through the MR switch from the MR modulator and may be output as the output signal.

In addition, the processor 12 may interpolate the first period of the MR modulator to be the same as the second period of the MR switch.

The MR switch may include a drop terminal and a through terminal, and a period when a signal is transmitted to the drop terminal and a period when a signal is transmitted to the through terminal may be the same.

Each of the plurality of microring resonators may include a waveguide, an optical coupler, and a phase shifter.

In addition, an optical network-on-chip system according to the second embodiment of the present disclosure may be a linear time invariant (LTI) system.

In addition, the equivalent model may be one equivalent model corresponding to all of the plurality of microring resonators.

The above-described present disclosure can be implemented as a computer-readable code on a medium on which a program is recorded. The computer readable medium includes all kinds of recording devices in which data that can be read by a computer system is stored. Examples of the computer readable medium may include a hard disk drive (HDD), a solid state disk (SSD), a silicon disk drive (SDD), a ROM, a RAM, a CD-ROM, a magnetic tape, a floppy disk, an optical data storage device, and the like, or be implemented in the form of a carrier wave (e.g. transmission over the internet). Accordingly, the above detailed description should not be construed in all aspects as limiting, and be considered illustrative. The scope of the present disclosure should be determined by rational interpretation of the appended claims, and all changes within the equivalent range of the present disclosure are included in the scope of the present disclosure.

In addition, although the embodiments have been described above, these are only examples and do not limit the present disclosure, and those of ordinary skill in the art to which the present disclosure belongs will appreciate that various modifications and applications not illustrated above are possible without departing from the essential features of the present embodiment. For example, each component specifically shown in the embodiments can be modified and implemented. In addition, differences related to these modifications and applications should be construed as being included in the scope of the present disclosure defined in the appended claims.

What is claimed is:

1. A simulation method for a system including a plurality of microring resonators, comprising:
synchronizing a first period, which is a calculation period of a microring resonator (MR) modulator, with a second period, which is a calculation period of the MR switch, wherein the plurality of microring resonators include the MR modulator and the MR switch,
interpolating the first period to match the second period for faster stabilization based on the following equation:

$$\begin{cases} y_{on \to off}(t) = y_{off} + (y_{on} - y_{off}) \cdot (r_{off} \cdot \beta_{off})^{\frac{t}{\tau c_{md}}} \\ y_{off \to on}(t) = y_{on} + (y_{off} - y_{on}) \cdot (r_{on} \cdot \beta_{on})^{\frac{t}{\tau c_{md}}} \end{cases}$$

where the $\tau c_{md}$ is the first period before the interpolating, the $r_{on}$ is a self-coupling ratio value of an optical coupler included in the microring resonator in an ON state, the $\beta_{on}$ is a transfer coefficient of a phase shifter included in the microring resonator in the ON state, $r_{off}$ is a self-coupling ratio value of an optical coupler included in the microring resonator in an OFF state, and $\beta_{off}$ is a transfer coefficient of a phase shifter included in the microring resonator in the OFF state;
generating an equivalent model corresponding to the plurality of microring resonators based on parameters for the plurality of microring resonators;
generating a virtual system including the equivalent model;
inputting an input signal to the virtual system; and
outputting an output signal from the virtual system based on the matching first and second periods.

2. The simulation method of claim 1, wherein the input signal passes through the MR switch from the MR modulator and is output as the output signal.

3. The simulation method of claim 1, wherein the MR switch includes a drop terminal and a through terminal, and
a period of a signal transmitted to the drop terminal and a period of a signal transmitted to the through terminal are the same.

4. The simulation method of claim 1, wherein each of the plurality of microring resonators further includes a waveguide.

5. The simulation method of claim 4, wherein the parameters include a self-coupling ratio of the optical coupler, a cross-coupling ratio of the optical coupler, a transfer coefficient of the phase shifter, and a round-trip time of the phase shifter.

6. The simulation method of claim 1, wherein the parameters include parameters for attenuation, phase shift, and time delay.

7. The simulation method of claim 1, wherein the system is a linear time invariant (LTI) system.

8. The simulation method of claim 1, wherein the equivalent model is one equivalent model corresponding to all of the plurality of microring resonators.

9. A simulator for a system including a plurality of microring resonators, comprising:
a memory configured to store a program; and
a processor configured to execute the program to cause the system to
synchronize a first period, which is a calculation period of a microring resonator (MR) modulator, with a second period, which is a calculation period of the MR switch, wherein the plurality of microring resonators include the MR modulator and the MR switch,
interpolate the first period to match the second period for faster stabilization based on the following equation:

$$\begin{cases} y_{on-off}(t) = y_{off} + (y_{on} - y_{off}) \cdot (r_{off} \cdot \beta_{off})^{\frac{t}{\tau c_{md}}} \\ y_{off-on}(t) = y_{on} + (y_{off} - y_{on}) \cdot (r_{on} \cdot \beta_{on})^{\frac{t}{\tau c_{md}}} \end{cases}$$

where the $\tau c_{md}$ is the first period before the interpolating, the $r_{on}$ is a self-coupling ratio value of an optical coupler included in the microring resonator in an ON state, the $\beta_{on}$ is a transfer coefficient of a phase shifter included in the microring resonator in the ON state, $r_{off}$ is a self-coupling ratio value of an optical coupler included in the microring resonator in an OFF state, and $\beta_{off}$ is a transfer coefficient of a phase shifter included in the microring resonator in the OFF state,
generate an equivalent model corresponding to the plurality of microring resonators based on parameters for the plurality of microring resonators,
generate a virtual system including the equivalent model,
input an input signal to the virtual system, and
output an output signal from the virtual system based on the matching first and second periods.

10. The simulator of claim 9, wherein the input signal passes through the MR switch from the MR modulator and is output as the output signal.

11. The simulator of claim 9, wherein the MR switch includes a drop terminal and a through terminal, and
a period when a signal is transmitted to the drop terminal and a period when a signal is transmitted to the through terminal are the same.

12. The simulator of claim 9, wherein each of the plurality of microring resonators further includes a waveguide.

13. The simulator of claim 12, wherein the parameters include a self-coupling ratio of the optical coupler, a cross-coupling ratio of the optical coupler, a transfer coefficient of the phase shifter, and a round-trip time of the phase shifter.

14. The simulator of claim 9, wherein the parameters include parameters for attenuation, phase shift, and time delay.

15. The simulator of claim 9, wherein the system is a linear time invariant (LTI) system.

16. The simulator of claim 9, wherein the equivalent model is one equivalent model corresponding to all of the plurality of microring resonators.

\* \* \* \* \*